(12) United States Patent
Kobayashi (10) Patent No.: US 12,163,687 B2
(45) Date of Patent: Dec. 10, 2024

(54) AIR CONDITIONING SYSTEM, AIR-CONDITIONING CONTROL PROGRAM, AND STORAGE MEDIUM STORING AIR-CONDITIONING CONTROL PROGRAM

(71) Applicant: Panasonic Intellectual Property Management Co., Ltd., Osaka (JP)

(72) Inventor: Kazuyuki Kobayashi, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 606 days.

(21) Appl. No.: 17/430,775

(22) PCT Filed: Feb. 7, 2020

(86) PCT No.: PCT/JP2020/004783
§ 371 (c)(1),
(2) Date: Mar. 8, 2022

(87) PCT Pub. No.: WO2020/175103
PCT Pub. Date: Sep. 3, 2020

(65) Prior Publication Data
US 2023/0147059 A1    May 11, 2023

(30) Foreign Application Priority Data
Feb. 27, 2019   (JP) ................................. 2019-034134

(51) Int. Cl.
*F24F 11/74*   (2018.01)
*F24F 3/044*   (2006.01)
*F24F 110/10*  (2018.01)

(52) U.S. Cl.
CPC .............. *F24F 11/74* (2018.01); *F24F 3/044* (2013.01); *F24F 2110/10* (2018.01)

(58) Field of Classification Search
CPC ........ F24F 11/74; F24F 3/044; F24F 2110/10; F24F 7/06; F24F 11/46; F24F 11/62; F24F 11/77
See application file for complete search history.

(56) References Cited

U.S. PATENT DOCUMENTS

| 2,708,568 A | * | 5/1955 | Marshall | ................ F24F 3/0522 165/216 |
| 3,899,022 A | * | 8/1975 | Persson | ................. F24F 3/0442 165/299 |

FOREIGN PATENT DOCUMENTS

| JP | H0526501 A | * | 2/1993 |
| JP | H05-106905 A | | 4/1993 |

(Continued)

OTHER PUBLICATIONS

International Search Report issued in Patent Application No. PCT/JP2020/004783 dated Mar. 17, 2020.

*Primary Examiner* — Kun Kai Ma
(74) *Attorney, Agent, or Firm* — PEARNE & GORDON LLP (57) ABSTRACT

Control device (10) includes air conditioning controller (31) and air conditioning load factor calculator (32). Air conditioning load factor calculator (32) calculates air conditioning load factors 36a and the like for rooms. Air conditioning controller (31) calculates a distribution of air volumes of air conveyed from an air conditioning room to the rooms based on air conditioning load factors (36a). Air conditioning controller 31 controls air conveyance fans (3a to 3d) in accordance with the distribution of the air volumes.

7 Claims, 5 Drawing Sheets

(56) References Cited

FOREIGN PATENT DOCUMENTS

| | | | | |
|---|---|---|---|---|
| JP | 2001091036 A | * | 4/2001 | |
| JP | 2005188884 A | * | 7/2005 | |
| JP | 2011094899 A | * | 5/2011 | |
| JP | 2011127845 A | * | 6/2011 | |
| JP | 2017-198395 A | | 11/2017 | |
| WO | WO-2017038484 A1 | * | 3/2017 | .............. F24F 11/04 |

\* cited by examiner

ROOM LABEL A → (C)

| Day | Row | 8:00 | 9:00 | 10:00 | 11:00 | 12:00 | 13:00–14:00 |
|---|---|---|---|---|---|---|---|
| 1ST DAY 2/5 | CALCULATED LOAD FACTOR | 1.1 | 1.1 | 0.8 | 1.3 | 1.2 | 1.2 |
| | TIME LABEL | (AH8-9) 1.10 | (AH9-10) 1.10 | (AH10-11) 0.80 | (AH11-12) 1.30 | (AH12-13) 1.20 | (AH13-14) 1.20 |
| | ROOM LABEL A | 1.10 | 1.10 | 1.00 | 1.08 | 1.10 | 1.12 |
| 2ND DAY 2/6 | CALCULATED LOAD FACTOR | 1.1 | —(1.1) | —(0.8) | 1.2 | 1.3 | —(1.2) |
| | TIME LABEL | (AH8-9) 1.10 | (AH9-10) 1.10 | (AH10-11) 0.80 | (AH11-12) 1.25 | (AH12-13) 1.25 | (AH13-14) 1.20 |
| | ROOM LABEL A | 1.10 | 1.10 | 1.04 | 1.07 | 1.10 | 1.12 |
| 3RD DAY 2/7 | CALCULATED LOAD FACTOR | —(1.1) | 1.1 | 0.9 | 1.1 | 1.0 | 1.1 |
| | TIME LABEL | (AH8-9) 1.10 | (AH9-10) 1.10 | (AH10-11) 0.83 | (AH11-12) 1.20 | (AH12-13) 1.17 | (AH13-14) 1.17 |
| | ROOM LABEL A | 1.10 | 1.10 | 1.05 | 1.07 | 1.08 | 1.09 |
| 4TH DAY 2/8 | CALCULATED LOAD FACTOR | —(1.1) | 1.1 | —(0.9) | 1.1 | 1.0 | 1.1 |
| | TIME LABEL | (AH8-9) 1.10 | (AH9-10) 1.10 | (AH10-11) 0.83←(B) | (AH11-12) 1.18 | (AH12-13) 1.13 | (AH13-14) 1.15 |
| | ROOM LABEL A | 1.00 | 1.02 | 0.99 | 1.02 | 1.05 | 1.06 |
| 5TH DAY 2/9 | CALCULATED LOAD FACTOR | —(1.1) | 1.1 | —(0.9) | —(1.1) | 1.0 | 1.1 |
| | TIME LABEL | (AH8-9) 1.10 | (AH9-10) 1.10 | (AH10-11) 0.83 | (AH11-12) 1.18 | (AH12-13) 1.10 | (AH13-14) 1.14 |
| | ROOM LABEL A | 1.05 | 1.06 | 1.02 | 1.04 | 1.05 | 1.06 |
| 6TH DAY 2/10 | CALCULATED LOAD FACTOR | —(1.1) | 1.1 | 0.9 | —(1.1) | 1.0 | 1.1 |
| | TIME LABEL | (AH8-9) 1.10 | (AH9-10) 1.10 | (AH10-11) 0.85 | (AH11-12) 1.18 | (AH12-13) 1.06 | (AH13-14) 1.12 |
| | ROOM LABEL A | 1.10 | 1.10 | 1.05 | 1.07 | 1.06 | 1.06 |

(A)

AIR CONDITIONING SYSTEM, AIR-CONDITIONING CONTROL PROGRAM, AND STORAGE MEDIUM STORING AIR-CONDITIONING CONTROL PROGRAM

TECHNICAL FIELD

The present invention relates to an air conditioning system, an air-conditioning control program, and a storage medium storing an air-conditioning control program.

BACKGROUND ART

In a house including a plurality of rooms, there has been known a whole building air conditioning system in which at least one air conditioning room is independently provided to control air conditioning in the air conditioning room, an air supply duct that connects the air conditioning room and the rooms is provided, and air in the air conditioning room is individually distributed (for example, PTL 1).

In the related art, in this type of air conditioning system, individual setting switches and temperature sensors for measuring room temperatures of the rooms are arranged for the rooms, and air blowing volumes of air distributed from the air conditioning room are controlled based on differences between set target temperatures and the room temperatures measured by the temperature sensors.

CITATION LIST

Patent Literature

PTL 1: Unexamined Japanese Patent Publication No. 2011-127845

SUMMARY OF THE INVENTION

Since rooms partitioned individually have different sizes of spaces, different energies (air conditioning loads) of air conditioning required to reach the target temperatures are different for the rooms. In each of the rooms, the air conditioning load also varies depending on the presence or absence of solar radiation, the presence of heat load equipment, a time zone when people are present, and a number of people.

However, in the air conditioning system in the related art, since the air blowing volumes from the air conditioning room to the rooms are decided for the rooms without considering the air conditioning loads in the rooms, there is a problem that a state such as not being easily cooled, not being easily heated, being excessively cooled, or being excessively heated may occur depending on the air conditioning loads of the rooms.

The present invention has been made to solve the above problems, and an object of the present invention is to provide an air conditioning system and an air-conditioning control program capable of appropriately blowing air in an air conditioning room to rooms in consideration of air conditioning loads of the rooms.

In order to achieve an object, an air conditioning system of the present invention includes an air conditioning apparatus that is provided in an air conditioning room communicatively connected with a plurality of rooms, air conveyance fans that are provided to correspond to the plurality of rooms in order to convey air in the air conditioning room to the plurality of rooms, and a control device that calculates a distribution of air volumes of the air conveyed from the air conditioning room to the plurality of rooms based on air conditioning load factors corresponding to the plurality of rooms, and controls the air conveyance fans in accordance with the distribution of the air volumes.

An air-conditioning control program of the present invention is executed by a control device that controls operations of air conveyance fans provided so as to correspond to a plurality of rooms in order to convey, to the plurality of rooms, air in an air conditioning room which is communicatively connected with the plurality of rooms and includes an air conditioning apparatus. The air-conditioning control program causes the control device to operate following processes of calculating a distribution of air volumes of air conveyed to the plurality of rooms from the air conditioning room based on air conditioning load factors corresponding to the plurality of rooms, and controlling the air conveyance fans in accordance with the distribution of the air volumes.

A storage medium of the present invention stores the above air-conditioning control program.

According to the air conditioning system and the air-conditioning control program of the present invention, the distribution of the air volumes of the air conveyed from the air conditioning room to the plurality of rooms is calculated based on the air conditioning load factors set for the rooms, and the air conveyance fans are controlled in accordance with the distribution of the air volumes. Thus, there is an effect that the air in the air conditioning room can be appropriately blown to the rooms in consideration of the air conditioning loads of the rooms.

DESCRIPTION OF EMBODIMENT

Hereinafter, an embodiment of the present invention will be described with reference to the accompanying drawings. The following exemplary embodiment illustrates a preferred specific example of the present invention. Thus, numerical values, shapes, materials, components, arranged positions and connection forms of the components, steps (processes), orders of steps, and the like to be illustrated in the following exemplary embodiment are examples and are not to limit the scope of the present invention. Accordingly, among the components in the following exemplary embodiment, the components that are not recited in the independent claim(s) representing the most superordinate concept are described herein as optional components. In each drawing, substantially the same components are denoted by the same reference marks, and the redundant description will be omitted or simplified.

Figure 1:
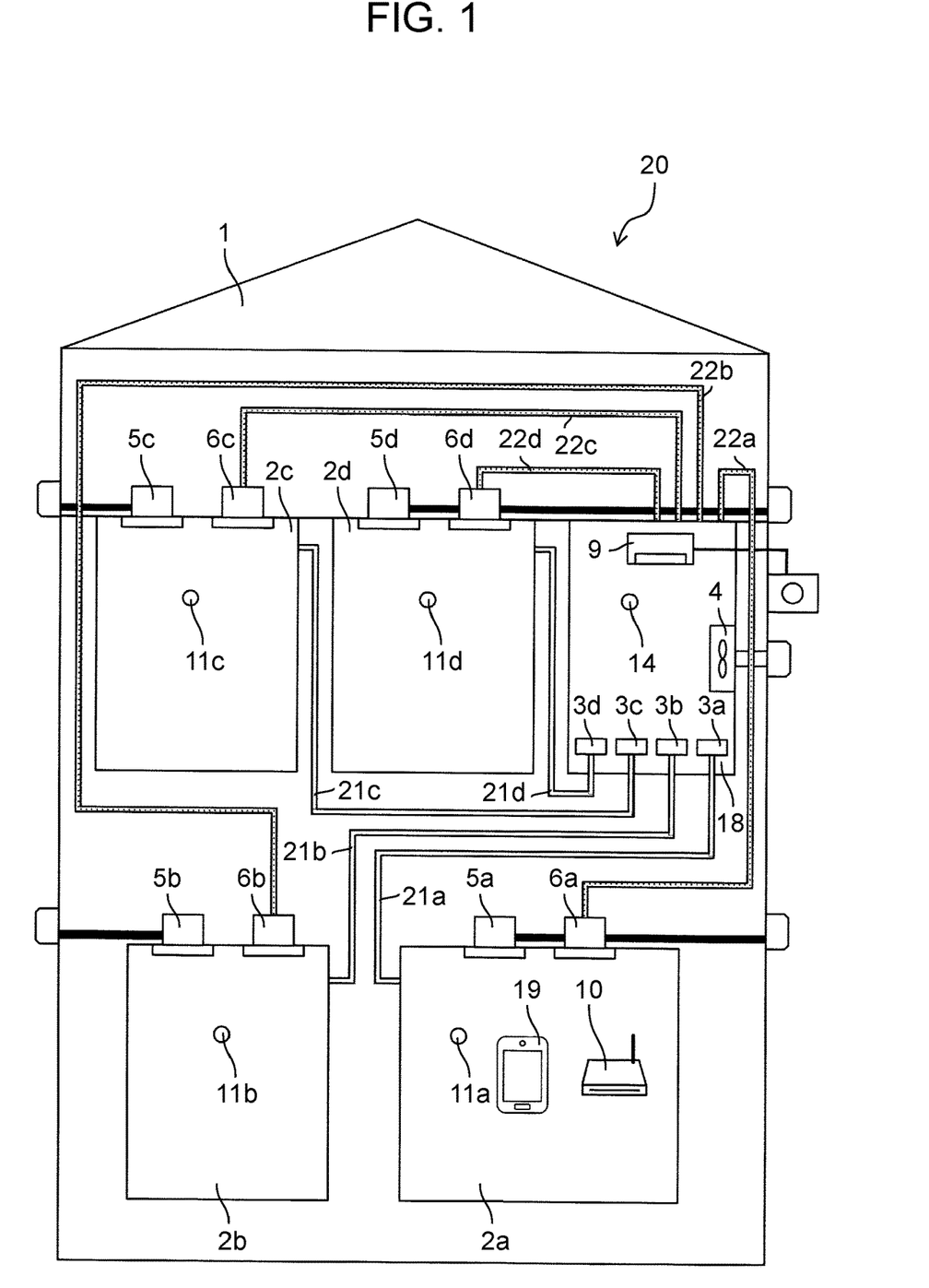
FIG. 1 is a connection schematic diagram of an air conditioning system according to an exemplary embodiment of the present invention.

First, a schematic configuration of air conditioning system 20 according to an exemplary embodiment of the present invention will be described with reference to FIG. 1. FIG. 1 is a connection schematic diagram of air conditioning system 20 according to the present exemplary embodiment.

Air conditioning system 20 includes outside air introduction fan 4, a plurality of discharge fans 5a, 5b, 5c, and 5d, a plurality of air conveyance fans 3a, 3b, 3c, and 3d, a plurality of circulation fans 6a, 6b, 6c, and 6d, a plurality of room temperature sensors 11a, 11b, 11c, and 11d, air conditioning room temperature sensor 14, air conditioner (air conditioning apparatus) 9, input and output terminal 19, and control device 10.

Air conditioning system 20 is installed in general residence 1 which is an example of a building. General residence 1 includes at least one air conditioning room 18 independent of rooms 2a to 2d in addition to a plurality of (four in the present exemplary embodiment) rooms 2a to 2d. Here, general residence 1 (residence) is a residence provided as a place where residents live a private life, and as a general configuration, the rooms include a living room, a dining room, a bedroom, a private room, a children's room, and the like. The rooms provided by air conditioning system 20 may include a toilet, a bathroom, a washroom, a dressing room, and the like.

Air conditioning room 18 is communicatively connected with rooms 2a to 2d via ducts 21a to 21d. Air conditioning room 18 is further communicatively connected with rooms 2a to 2d via ducts 22a to 22d. In air conditioning room 18, outside air is taken into air conditioning room 18 by outside air introduction fan 4 and is mixed with air conveyed from each of rooms 2a to 2d by circulation fans 6a to 6d. The air in air conditioning room 18 is air-conditioned by controlling a temperature by air conditioner 9 as the air conditioning apparatus provided in air conditioning room 18. The air conditioned in air conditioning room 18 is conveyed to rooms 2a to 2d by air conveyance fans 3a to 3d.

Air in each of rooms 2a to 2d is conveyed to air conditioning room 18 by circulation fans 6a to 6d, and is discharged as the outside air from the insides of rooms 2a to 2d to the outside of general residence 1 by discharge fans 5a to 5d. Air conditioning system 20 discharges the outside air from the insides of the rooms by controlling air discharge volumes of discharge fans 5a to 5d, and takes the outside air into the rooms by controlling an air supply volume of outside air introduction fan 4 by the linkage with the air discharge volumes of discharge fans 5a to 5d. In this manner, the air conditioning system performs ventilation by a first type ventilation method. The first type ventilation method refers to a method using the fans for both the supply air and the discharge air.

Outside air introduction fan 4 is a fan that takes the outside air into the rooms of general residence 1, and corresponds to an air supply function of an air supply fan or a heat exchange air fan. As described above, the outside air taken in by outside air introduction fan 4 is introduced into air conditioning room 18. The air supply volume of outside air introduction fan 4 is set in a plurality of levels, and the air discharge volume is set in accordance with the air discharge volumes of discharge fans 5a to 5d.

Discharge fans 5a to 5d are fans that discharge, as the outside air, a part of the air in the corresponding rooms 2a to 2d, and correspond to discharge functions of a ceiling embedded ventilation fan, a wall mounted ventilation fan, a range hood, and a heat exchange air fan. Discharge fan 5a is provided in room 2a, discharge fan 5b is provided in room 2b, discharge fan 5c is provided in room 2c, and discharge fan 5d is provided in room 2d.

Each of discharge fans 5a to 5d is configured such that the air discharge volume can be set in a plurality of levels. Normally, each of discharge fans 5a to 5d is controlled so as to have a preset air discharge volume. The air discharge volume is controlled for each of discharge fans 5a to 5d in accordance with settings by a user and values acquired by various sensors.

Air conveyance fans 3a to 3d are provided in air conditioning room 18 so as to correspond to rooms 2a to 2d. The air in air conditioning room 18 is conveyed to room 2a by air conveyance fan 3a, conveyed to room 2b by air conveyance fan 3b, conveyed to room 2c by air conveyance fan 3c, and conveyed to room 2d by air conveyance fan 3d. Air conveyance fans 3a to 3d may be provided in rooms 2a to 2d, respectively. Air conveyance fans 3a to 3d may be provided in ducts 21a to 21d connecting air conditioning room 18 and rooms 2a to 2d.

Each of air conveyance fans 3a to 3d is driven by a DC motor, and air volume constant control is performed such that air blowing volumes become constant at an air blowing volume set for each of air conveyance fans 3a to 3d. Each of air conveyance fans 3a to 3d has a maximum air volume of 110 cubic feet per minute (CFM) or 80 CFM depending on the size and purpose of the corresponding room (living room, bedroom, child's room, and the like). For the air conveyance fan having the maximum air volume of 110 CFM, the air blowing volume can be set in a range of 50 CFM to 110 CFM in increments of 10 CFM. For the air conveyance fan having the maximum air volume of 80 CFM, the air blowing volume can be set in a range of 30 CFM to 80 CFM in increments of 10 CFM.

Circulation fan 6a is provided in room 2a, circulation fan 6b is provided in room 2b, circulation fan 6c is provided in room 2c, and circulation fan 6d is provided in room 2d. A part of the air in each of rooms 2a to 2d is conveyed to air conditioning room 18 by corresponding circulation fans 6a to 6d. Instead of circulation fans 6a to 6d, the air may be returned to air conditioning room 18 via a shared space by pushing out the air in the rooms to the shared space in general residence 1 by a louver window or the like which transmits the air from each of rooms 2a to 2d.

Air conditioner 9 corresponds to the air conditioning apparatus of the present invention, and controls air conditioning of air conditioning room 18. Air conditioner 9 can set, as operation modes, a cooling operation for cooling the air in air conditioning room 18 and a heating operation for heating the air in air conditioning room 18, and cools or heats the air in air conditioning room 18 such that the temperature of the air in air conditioning room 18 becomes a set target temperature.

Room temperature sensor 11a is provided in room 2a, room temperature sensor 11b is provided in room 2b, room temperature sensor 11c is provided in room 2c, and room temperature sensor 11d is provided in room 2d. Room temperature sensors 11a to 11d are sensors that measure temperatures (room temperatures) of corresponding rooms 2a to 2d and transmit the measured room temperatures to control device 10.

Air conditioning room temperature sensor 14 is a sensor that is provided in air conditioning room 18, measures the temperature of the air in air conditioning room 18 (air conditioning room temperature), generates a signal indicating the air conditioning room temperature, and transmits the signal to control device 10.

Control device 10 is a controller that controls entire air conditioning system 20. For example, control device 10 controls operations of air conditioner 9 provided in air conditioning room 18 and air conveyance fans 3a to 3d provided corresponding to rooms 2a to 2d. Control device 10 is connected to be able to communicate with outside air introduction fan 4, discharge fans 5a to 5d, air conveyance fans 3a to 3d, circulation fans 6a to 6d, room temperature sensors 11a to 11d, air conditioning room temperature sensor 14, and air conditioner 9 by wireless communication.

Specifically, control device 10 sets the target temperature of air conditioning room 18 based on a target temperature set for each of rooms 2a to 2d by input and output terminal 19 to be described later. Control device 10 controls air conditioner 9 based on the temperature of air conditioning room 18 measured by air conditioning room temperature sensor 14 such that the temperature and humidity of air conditioning room 18 become the target temperature set for air conditioning room 18.

For each of rooms 2a to 2d, control device 10 sets an air conditioning load factor of the corresponding room from energy required for air conditioning of the room. Control device 10 calculates a distribution of air volumes blown from air conditioning room 18 to rooms 2a to 2d based on the set air conditioning load factors of rooms 2a to 2d, and controls each of air conveyance fans 3a to 3d in accordance with the distribution of the air volumes.

Accordingly, the air conditioned in air conditioning room 18 is appropriately conveyed to each of rooms 2a to 2d by the air blowing volume corresponding to the air conditioning load factor of each of rooms 2a to 2d. Thus, in each of rooms 2a to 2d, control is performed so as to achieve the target temperature set in each of rooms 2a to 2d without causing a state of not being easily cooled, not being easily heated, being excessively cooled, or being excessively heated.

The setting of the air conditioning load factor and the control of air conveyance fans 3a to 3d will be described later with reference to FIGS. 2 to 5.

Control device 10 controls outside air introduction fan 4 and discharge fans 5a to 5d by the linkage with each other by, for example, setting the air supply volume of outside air introduction fan 4 so as to have the air volume corresponding to the air discharge volumes of discharge fans 5a to 5d. Accordingly, general residence 1 is ventilated by the first type ventilation method.

Here, control device 10 is connected to outside air introduction fan 4, discharge fans 5a to 5d, air conveyance fans 3a to 3d, circulation fans 6a to 6d, room temperature sensors 11a to 11d, air conditioning room temperature sensor 14, air conditioning room humidity sensor 15, and air conditioner 9 by wireless communication, and thus, a complicated wiring work can be unnecessary. However, all these devices, or control device 10 and a part of these devices may be configured to be able to communicate by wired communication.

In the present exemplary embodiment, a case where control device 10 is installed as an independent device will be described, but the control device may be incorporated in air conditioner 9 or another device. Control device 10 is not necessarily installed in general residence 1, and may be implemented by a so-called cloud by an external server.

Input and output terminal 19 is connected to be able to communicate with control device 10 by wireless communication, receives an input of information necessary for constructing air conditioning system 20, and stores the information in control device 10, or acquires a state of air conditioning system 20 from control device 10 and displays the state. The target temperature for each of rooms 2a to 2d is also set by the user from input and output terminal 19. Examples of input and output terminal 19 include a mobile information terminal such as a mobile phone, a smartphone, and a tablet.

Input and output terminal 19 is not necessarily connected to control device 10 by wireless communication, and may be connected to be able to communicate with control device 10 by wired communication. In this case, input and output terminal 19 may be implemented by, for example, a remote controller on a wall. In the example illustrated in FIG. 1, one input and output terminal 19 is provided, but a plurality of input and output terminals 19 may be provided, and for example, may be provided in rooms 2a to 2d, respectively.

Figure 2:
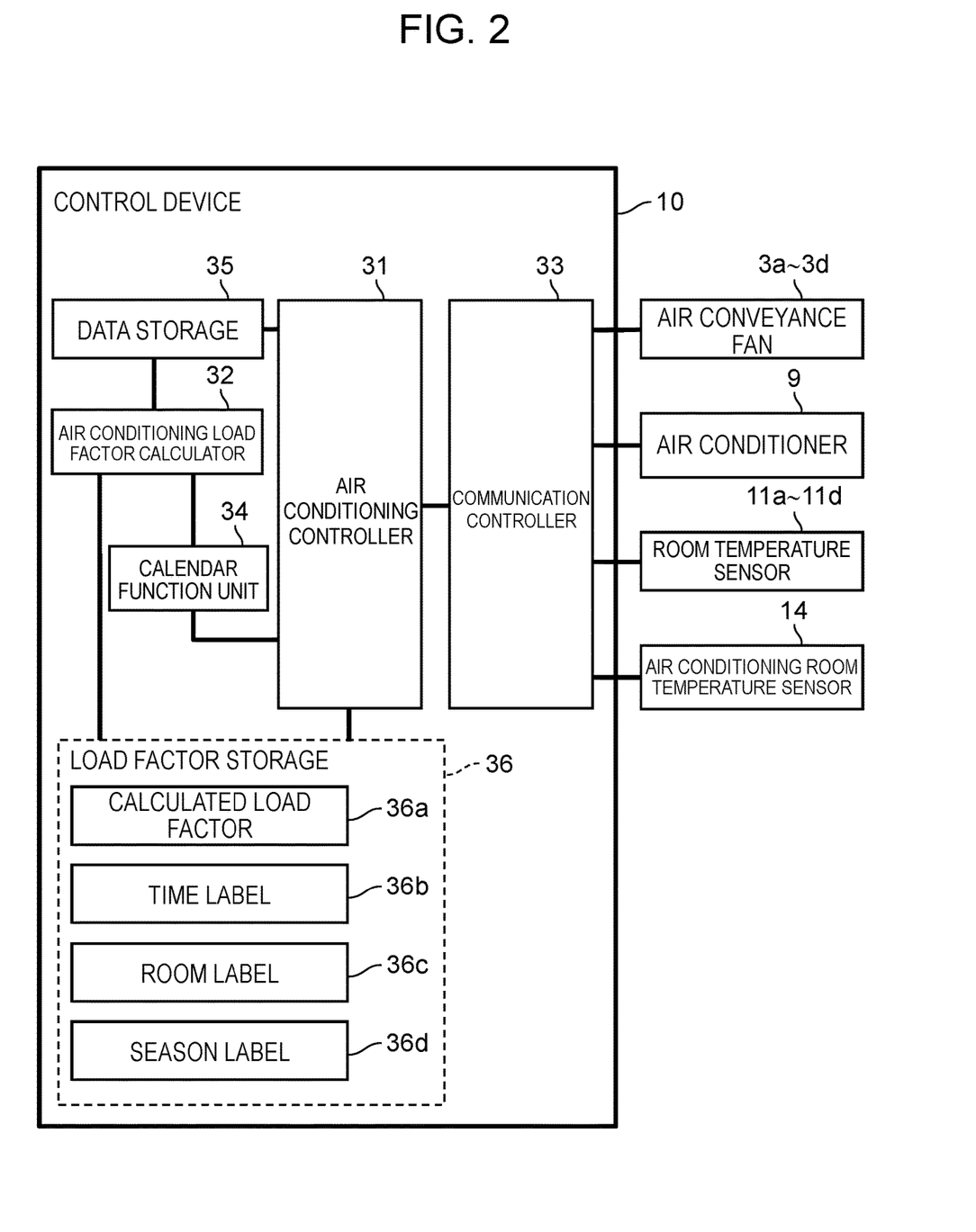
FIG. 2 is a schematic functional block diagram of a control device of the air conditioning system.

Next, functions of control device 10 will be described with reference to FIG. 2. FIG. 2 is a schematic functional block diagram of control device 10.

Control device 10 includes at least air conditioning controller 31, air conditioning load factor calculator 32, communication controller 33, calendar function unit 34, data storage 35, and load factor storage 36.

Air conditioning controller 31 controls the operations of air conditioner 9 and air conveyance fans 3a to 3d. For example, air conditioning controller 31 sets the operation of air conditioner 9 to the cooling operation or the heating operation and sets the target temperature of air conditioning room 18 based on the target temperature or the like set for each of rooms 2a to 2d. Air conditioning controller 31 calculates the distribution of the air volumes blown from air conditioning room 18 to rooms 2a to 2d based on the air conditioning load factors set for rooms 2a to 2d, and controls each of air conveyance fans 3a to 3d in accordance with the distribution of the air volumes. Details of air conditioning controller 31 will be described later with reference to FIG. 5.

Air conditioning load factor calculator 32 calculates, for each of rooms 2a to 2d, an air conditioning load factor of the room for each time zone based on energy required for air conditioning in the corresponding room. In the present exemplary embodiment, a length of one time zone is one hour. That is, from 0:00 to 1:00, from 1:00 to 2:00, from 2:00 to 3:00, . . . , from 22:00 to 23:00, and from 23:00 to 24:00 are the time zones. Air conditioning load factor calculator 32 calculates the air conditioning load factor of each of rooms 2a to 2d for each time zone. The air conditioning load factor calculated here is stored in load factor storage 36. Details of air conditioning load factor calculator 32 will be described later with reference to FIG. 4. The length of the time zone is not necessarily one hour, and may be randomly assigned, such as two hours or three hours.

Communication controller 33 controls communication performed between air conditioning controller 31 and air conveyance fans 3a to 3d, air conditioner 9, room temperature sensors 11a to 11d, and air conditioning room temperature sensor 14. Air conditioning controller 31 controls the operation of each of air conveyance fans 3a to 3d by transmitting the air blowing volume for each of air conveyance fans 3a to 3d set by air conditioning controller 31 to the corresponding air conveyance fan via communication controller 33.

Air conditioning controller 31 controls the operation of air conditioner 9 by transmitting the operation mode (cooling operation or heating operation) of air conditioner 9 and the target temperature of air conditioning room 18 set by air conditioning controller 31 to air conditioner 9 via communication controller 33.

Air conditioning controller 31 periodically acquires the temperatures of rooms 2a to 2d measured by room temperature sensors 11a to 11d from room temperature sensors 11a to 11d provided in rooms 2a to 2d at predetermined time intervals via communication controller 33. Air conditioning controller 31 sets the operation mode of air conditioner 9 and decides the air blowing volume of each of air conveyance fans 3a to 3d based on the acquired temperature of each of rooms 2a to 2d. Air conditioning controller 31 stores the temperature of the room periodically acquired for each of rooms 2a to 2d in data storage 35.

Air conditioning controller 31 periodically acquires the measured temperature of air conditioning room 18 from air conditioning room temperature sensor 14 provided in air conditioning room 18 via communication controller 33 at predetermined time intervals. Air conditioning controller 31 stores the periodically acquired temperature of air conditioning room 18 in data storage 35.

Calendar function unit 34 outputs date and time at this time to air conditioning controller 31 and air conditioning load factor calculator 32, and includes, for example, a real time clock. Air conditioning controller 31 determines the air conditioning load factor of each of rooms 2a to 2d at this date and time based on the date and time indicated by calendar function unit 34, and decides the air blowing volume of each of air conveyance fans 3a to 3d. Air conditioning load factor calculator 32 sets the air conditioning load factor of each of rooms 2a to 2d for each time zone or season (month) based on the date and time indicated by calendar function unit 34.

Data storage 35 stores information necessary for setting the air conditioning load factor of each of rooms 2a to 2d, and is written by air conditioning controller 31. When a predetermined time zone is started, air conditioning controller 31 stores, as an original room temperature, the room temperature of each of rooms 2a to 2d at this time in data storage 35. Air conditioning controller 31 stores, in data storage 35, the passage of time of the room temperature of each of rooms 2a to 2d, the passage of time of the air blowing volume of each of air conveyance fans 3a to 3d, and the passage of time of the air conditioning room temperature of air conditioning room 18 in this time zone. Air conditioning load factor calculator 32 sets the air conditioning load factor for each of rooms 2a to 2d based on the original room temperature of each of rooms 2a to 2d, the passage of time of the room temperature of each of rooms 2a to 2d, the passage of time of the air blowing volume of each of air conveyance fans 3a to 3d, and the passage of time of the air conditioning room temperature of air conditioning room 18 stored in data storage 35.

Figure 3:
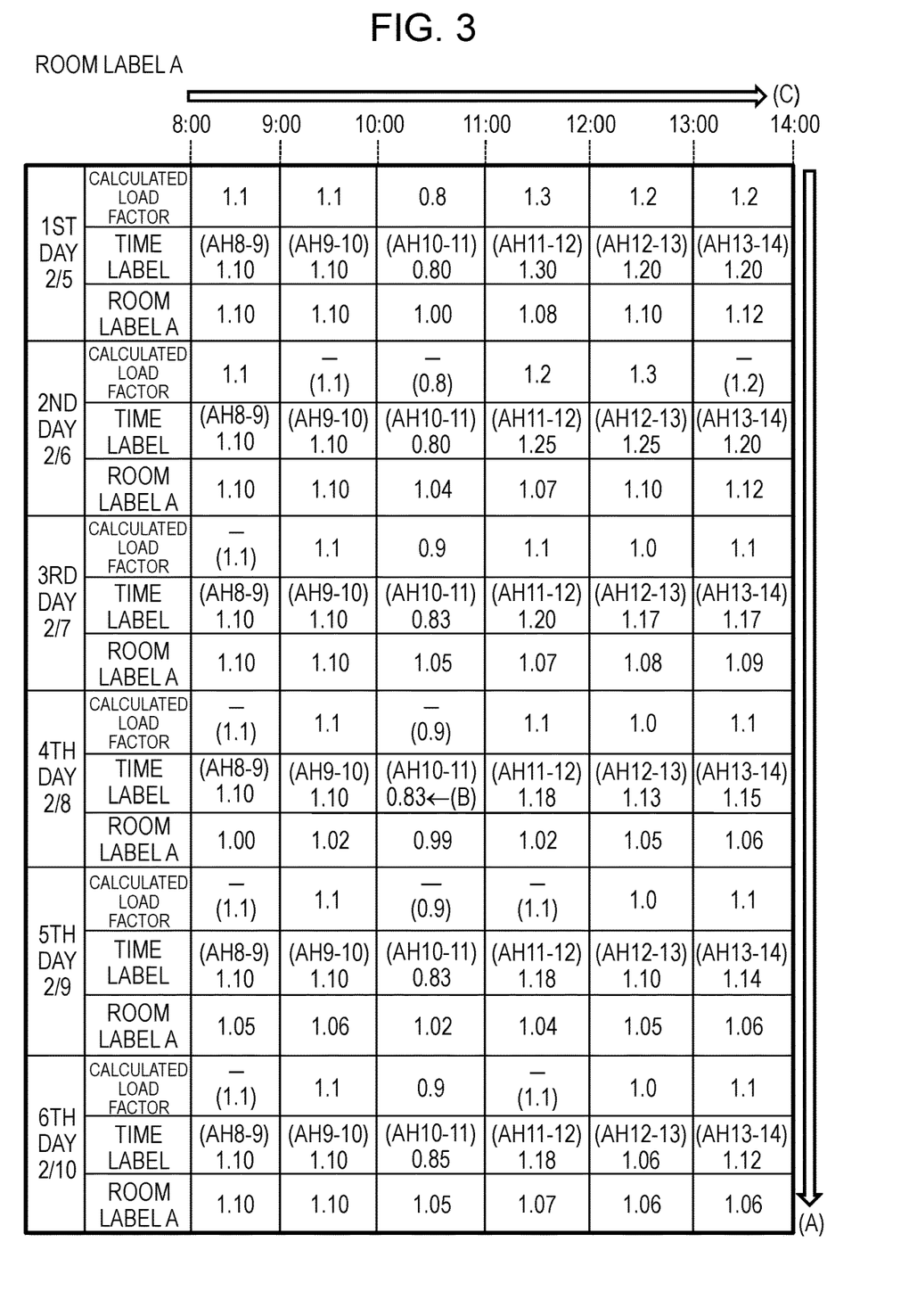
FIG. 3 is a schematic diagram schematically illustrating a relationship between a calculated load factor, a time label, and a room label stored in a load factor storage of the control device.

Load factor storage 36 stores the air conditioning load factor set by air conditioning load factor calculator 32. Examples of the air conditioning load factor stored in load factor storage 36 include calculated load factor 36a, time label 36b, room label 36c, and season label 36d. Calculated load factor 36a, time label 36b, room label 36c, and season label 36d are stored for each of rooms 2a to 2d. Details of load factor storage 36 will be described with reference to FIG. 3. FIG. 3 is a schematic diagram schematically illustrating a relationship between calculated load factor 36a, time label 36b, and room label 36c stored in load factor storage 36.

Calculated load factor 36a is the air conditioning load factor itself calculated for each time zone in a target room. Here, air conditioning load factor R in one time zone is calculated by air conditioning load factor calculator 32 by following Equation (1).

$$R = \Delta S \times F / (TT - OT) \quad (1)$$

Where, TT is a target temperature set in the target room, OT is an air conditioning room temperature of air conditioning room 18, ΔS is a time from when one time zone is started in the target room to when the temperature reaches target temperature TT set in this room, and F is an air blowing volume set for the air conveyance fan that blows the air in air conditioning room 18 to the target room. These variables are acquired from data storage 35.

From above Equation (1), it can be said that air conditioning load factor R is set based on the amount of energy required for air conditioning in the corresponding room, and the larger the amount of energy required for air conditioning in the room, the larger the air conditioning load factor.

As described above, for each of rooms 2a to 2d, air conditioning load factor R is calculated based on air blowing volume F blown from air conditioning room 18 to the corresponding room within a predetermined time and a temperature change amount of the corresponding room acquired by each of room temperature sensors 11a to 11d. Thus, air conditioning load factor R can be easily obtained without complicated setting and calculation.

In the present exemplary embodiment, as described above, one time zone is set every hour from 0:00 to 1:00, from 1:00 to 2:00, from 2:00 to 3:00, . . . , from 22:00 to 23:00, and from 23:00 to 24:00. In the present exemplary embodiment, air conditioning load factors R for at least five days are stored for each of rooms 2a to 2d in each time zone, and time labels 36b to be described later are calculated. Thus, load factor storage 36 stores, as calculated load factors 36a, the air conditioning load factors for a number of rooms×24 time zones×5 days.

Time label 36b indicates an air conditioning load factor in a predetermined time zone for each of rooms 2a to 2d, that is, for each of from 0:00 to 1:00, from 1:00 to 2:00, from 2:00 to 3:00, . . . , from 22:00 to 23:00, and from 23:00 to 24:00. That is, time labels 36b are stored for a predetermined number of time zones in each room. However, in the present exemplary embodiment, time labels 36b for one month (up to 31 days) for calculating season label 36d to be described later can be stored.

For one room, air conditioning load factor calculator 32 calculates time label 36b from 0:00 to 1:00 by averaging calculated load factors 36a from 0:00 to 1:00 over the last predetermined number of days (five days in the present exemplary embodiment) calculated for the one room. Time label 36b in another time zone is also calculated by averaging calculated load factors 36a for the time zone for the last five days calculated for the one room ((A) of FIG. 3).

At the time of factory shipment of air conditioning system 20, predetermined initial values (for example, 1.00) are stored as initial values of time labels 36b for all the rooms and time zones. In the first day when air conditioning system 20 is operated for the first time, the air blowing volumes of air conveyance fans 3a to 3d are set by using the initial values of time labels 36b.

When five days have not passed after air conditioning system 20 is operated for the first time, there are no calculated load factors 36a for five days for each of rooms 2a to 2d. In this case, as time label 36b of each time zone, an average value of calculated load factors 36a from the first day to the second day is set for each time zone on the second day, an average value of calculated load factors 36a from the first day to the third day is set for each time zone on the third day, and an average value of calculated load factors 36a from the first day to the fourth day is set for each time zone on the fourth day.

As is clear from above Equation (1), calculated load factors 36a cannot be obtained when the room temperature does not reach target temperature TT set in the target room or when there is no difference between the target temperature of the room and the air conditioning room temperature in one time zone. In FIG. 3, a state in which calculated load factors 36a are not obtained is indicated as "-".

In a case where time label 36b in one time zone is set, when calculated load factors 36a of the one time zone of the day are not obtained, time label 36b of the same time zone of the previous day is set as it is ((B) of FIG. 3).

When time label 36b of one time zone is set by averaging calculated load factors 36a for the last five days (or several days), there may be a case where there are calculated load factors 36a that are not obtained among calculated load factors 36a up to the previous day used for the averaging. In this case, calculated load factors 36a obtained in the same time zone up to the previous day with respect to the day on which calculated load factors 36a are not obtained are set as calculated load factors 36a of the day on which calculated load factors are not obtained as they are, and the average value for the last five days (or several days) is calculated. For calculated load factors 36a in FIG. 3, a number in parentheses indicates that calculated load factors 36a obtained in the same time zone up to the previous day with respect to the day on which calculated load factors 36a are not obtained are set as calculated load factors 36a of the day on which calculated load factors are not obtained as they are.

Air conditioning controller 31 reads out time label 36b of each of rooms 2a to 2d in the time zone from load factor storage 36 from a time output from calendar function unit 34, and distributes the air blowing volumes of air conveyance fans 3a to 3d. Since solar radiation to each of rooms 2a to 2d, presence or absence of a person, and the like change depending on the time zone, the air conditioning load factor of each of rooms 2a to 2d also changes. By using time label 36b indicating the air conditioning load factor in each time zone for each of rooms 2a to 2d, the air conditioned in air conditioning room 18 can be appropriately distributed to each of rooms 2a to 2d depending on the time zone. As described above, among the air conditioning load factors, time label 36b is used as a factor that is a basis of air conditioning control of each of rooms 2a to 2d.

Room label 36c indicates an average air conditioning load factor in each of rooms 2a to 2d. That is, room labels 36c are stored as many as the number of rooms. For each of rooms 2a to 2d, air conditioning load factor calculator 32 averages time labels 36b set for five last consecutive time zones to this room ((C) of FIG. 3).

At the time of factory shipment of air conditioning system 20, predetermined initial values (for example, 1.00) are stored as the initial values of room labels 36c for all the rooms. Immediately after air conditioning system 20 is operated for the first time, the air blowing volumes of air conveyance fans 3a to 3d are set by using the initial values of room labels 36c.

In a state in which air conditioning system 20 is not operated for five time zones after being operated for the first time, there are no time labels 36b for the five time zones for each of rooms 2a to 2d. In this case, at a point in time when the first time zone is completed, air conditioning load factor calculator 32 sets time label 36b of the first time zone as it is as room label 36c of the corresponding room. Air conditioning load factor calculator 32 sets, as room labels 36c of the corresponding room, an average value of time labels 36b in two time zones at a point in time when the second time zone is completed, an average value of time labels 36b in three time zones at a point in time when the third time zone is completed, and an average value of time labels 36b in four time zones at a point in time when the fourth time zone is completed.

Air conditioning controller 31 adjusts the balance of the air blowing volume of air conditioning room 18 with respect to rooms 2a to 2d by estimating a size of the room space of each of rooms 2a to 2d based on a size of room label 36c of each of rooms 2a to 2d. That is, when the air blowing volume of the air of air conditioning room 18 with respect to each of rooms 2a to 2d is decided by using time label 36b of each of rooms 2a to 2d, since time label 36b reflects a fluctuation in an air conditioning load due to factors such as solar radiation, the air blowing volume of the air of air conditioning room 18 with respect to each of rooms 2a to 2d may be set to be larger than necessary with respect to the size of the room space. The size of the room space of each of rooms 2a to 2d is estimated by the size of room label 36c of each of rooms 2a to 2d, and the balance of the air blowing volume of the air in air conditioning room 18 with respect to rooms 2a to 2d is adjusted. Thus, it is possible to prevent the air blowing volume of the air in air conditioning room 18 with respect to each of rooms 2a to 2d from being set to be larger than necessary with respect to the size of the room space.

Season label 36d indicates an air conditioning load factor in a corresponding month for each of rooms 2a to 2d, for each month as a predetermined season, that is, for each of January, February, March, . . . , November, and December. That is, season label 36d is stored for 12 months for each of rooms 2a to 2d. When each month is ended, air conditioning load factor calculator 32 calculates, for each of rooms 2a to 2d, an average value of all time labels 36b set in each time zone in the month ended, and sets the average value as season label 36d of this month in this room.

Season label 36d is used to determine a direction of the air conditioning load calculation, for example, when a temperature range toward the cooling operation or the heating operation is different for each season.

At the time of factory shipment of air conditioning system 20, predetermined initial values (for example, 1.00) are stored as the initial values of season labels 36d for all the rooms and months. After air conditioning system 20 is operated for the first time, when season label 36d of the month in which air conditioning system 20 is operated is not set, the initial value of season label 36d is used.

Figure 4:
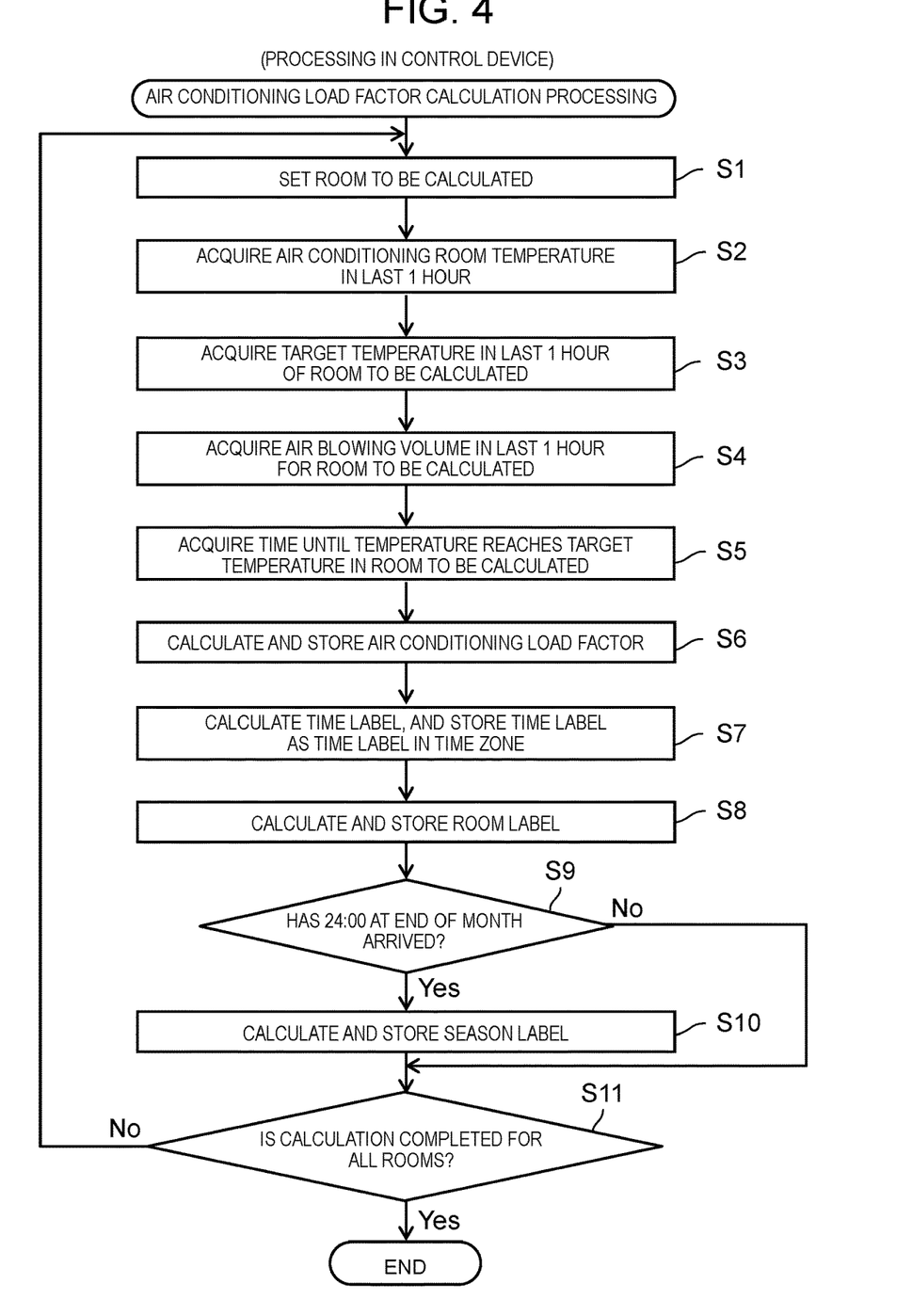
FIG. 4 is a flowchart illustrating air conditioning load factor calculation processing executed by the control device.

Next, air conditioning load factor calculation processing executed by control device 10 will be described with reference to FIG. 4. FIG. 4 is a flowchart illustrating the air conditioning load factor calculation processing. A program for causing control device 10 to execute the air conditioning load factor calculation processing is a part of an air-conditioning control program of the present invention. Control device 10 is caused to execute this program, and thus, control device 10 operates as air conditioning load factor calculator 32. This program is stored in a nonvolatile memory (not illustrated) provided in control device 10.

The air conditioning load factor calculation processing is processing of calculating, for each of rooms 2a to 2d, the air conditioning load factor of the corresponding room from energy required for air conditioning of this room. The air conditioning load factor calculation processing is executed at timings at which a predetermined time zone is switched (1:00, 2:00, 3:00, . . . , 23:00, and 24:00) based on the date and time output from calendar function unit 34.

When the air conditioning load factor calculation processing is executed, control device 10 first sets one room to be calculated from among rooms 2a to 2d for which the calculation processing is not executed yet (S1).

Subsequently, control device 10 acquires a temperature OT in air conditioning room 18 in the last 1 hour (last time zone) from data storage 35 (S2). Subsequently, control device 10 acquires target temperature TT set for the room to be calculated by the processing of S1 (S3). Control device 10 acquires, from data storage 35, air blowing volume F set for the last 1 hour with respect to the air conveyance fan corresponding to the room to be calculated (S4). In the room to be calculated, control device 10 acquires time ΔS until the temperature reaches set target temperature TT in the last 1 hour from information stored in data storage 35 (S5).

Control device 10 calculates air conditioning load factor R in the time zone of the last 1 hour by using above Equation (1), and stores air conditioning load factor R in load factor storage 36 as calculated load factor 36a of the calculated day in the time zone of the room to be calculated (S6).

Subsequently, control device 10 calculates time label 36b in the time zone of the last 1 hour by averaging calculated load factors 36a in the time zone of the last 5 days including the current day, and stores the time label as time label 36b in load factor storage 36 (S7). The method of setting time label 36b when there are no calculated load factors 36a for the time zone for the last 5 days including the current day, such as after factory shipment or when calculated load factors 36a are not obtained is as described above.

After the processing of S7, control device 10 calculates room label 36c of the room to be calculated by averaging time labels 36b of the last five time zones including time label 36b of the time zone calculated in the processing of S7, and stores room label 36c in load factor storage 36 (S8). The method of setting room label 36c when there are no time labels 36b of the last five time zones, such as after factory shipment, is as described above.

Subsequently, control device 10 determines whether or not the execution of the current air conditioning load factor calculation processing is started based on the fact that 24:00 at the end of the month has arrived from the date and time output from calendar function unit 34 (S9). As a result, a case where it is determined that the execution of the current air conditioning load factor calculation processing is started based on the fact that 24:00 at the end of the month has arrived (S9: Yes) means that the month including the end of the month is ended. Thus, in this case, control device 10 calculates an average value of all time labels 36b set in each time zone in the month ended, and stores the average value in load factor storage 36 as season label 36d of the month of the room (S10).

After the processing of S10 or when it is determined that the execution of the current air conditioning load factor calculation processing is not started based on the fact that 24:00 at the end of the month has arrived as a result of the processing of S9 (S9: No), control device 10 executes the processing of S11. In the processing of S11, it is determined whether or not the air conditioning load factors are calculated for all rooms 2a to 2d in the current air conditioning load factor calculation processing (S11). As a result, when there are rooms 2a to 2d for which the air conditioning load factors are not calculated yet (S11: No), control device 10 returns to the processing of S1 and calculates the air conditioning load factors for rooms 2a to 2d for which the air conditioning load factors are not calculated yet. On the other hand, when the air conditioning load factors are calculated for all rooms 2a to 2d (S11: Yes), control device 10 ends the air conditioning load factor calculation processing.

Figure 5:
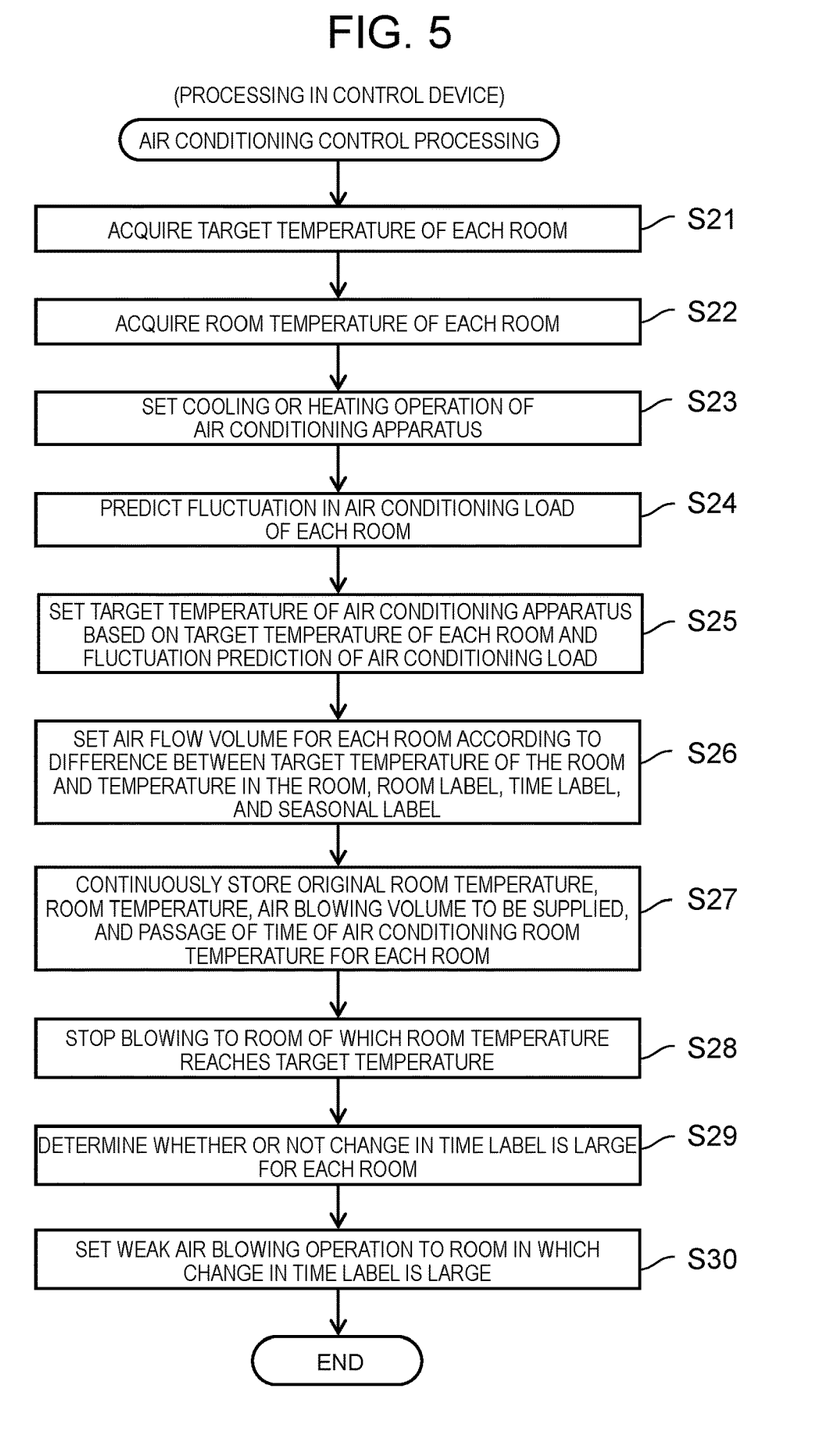
FIG. 5 is a flowchart illustrating air conditioning control processing executed by the control device.

Next, air conditioning control processing executed by control device 10 will be described with reference to FIG. 5. FIG. 5 is a flowchart illustrating the air conditioning control processing. A program for causing control device 10 to execute this air conditioning control processing is a part of the air-conditioning control program of the present invention, and control device 10 operates as air conditioning controller 31 by causing control device 10 to execute this program. This program is stored in a nonvolatile memory (not illustrated) provided in control device 10.

The air conditioning control processing is processing of controlling the entire air conditioning in general residence 1 by controlling the operations of air conditioner 9 and air conveyance fans 3a to 3d. The air conditioning control processing is executed at timings at which a predetermined time zone is switched (timings of 1:00, 2:00, 3:00, . . . , 23:00, and 24:00) based on the date and time output from calendar function unit 34.

When the air conditioning control processing is executed, control device 10 first acquires target temperature TT of each of rooms 2a to 2d set by input and output terminal 19 (S21). Subsequently, control device 10 acquires the current room temperatures in rooms 2a to 2d from room temperature sensors 11a to 11d (S22).

Control device 10 sets the operation mode of air conditioner 9 to either the cooling operation or the heating operation based on a difference between target temperature TT of each of rooms 2a to 2d acquired by the tasks of processing of S21 and S22 and the current room temperature (S23).

Subsequently, control device 10 determines the current time zone from the date and time output from calendar function unit 34, and predicts a temporal fluctuation in the air conditioning load in each of rooms 2a to 2d from time labels 36b of each of rooms 2a to 2d in the current time zone and the time zones before and after the current time zone (S24). Control device 10 sets the target temperature of air conditioning room 18 based on the target temperature of each of rooms 2a to 2d acquired by the processing of S21 and the magnitude of the fluctuation in the air conditioning load in each of rooms 2a to 2d predicted by the processing of S24 (S25).

In the processing of S25, the target temperature of air conditioning room 18 is set based on the magnitude of the fluctuation in the air conditioning load in each of rooms 2a to 2d predicted by the processing of S24. For example, as the fluctuation in the air conditioning load becomes larger, the target temperature of air conditioning room 18 is set to become lower than the target temperature set for each of rooms 2a to 2d during the cooling operation, and the target temperature of air conditioning room 18 is set to become higher than the target temperature set for each of rooms 2a to 2d during the heating operation. Accordingly, since the necessary air conditioning energy can be supplied in advance to the room in which the fluctuation in the air conditioning load is large, it is possible to prevent the necessary air conditioning energy from suddenly increasing as the air conditioning load increases thereafter. Thus, it is possible to prevent the air blowing volumes of air conveyance fans 3a to 3d from increasing, and it is possible to achieve an energy-saving operation and a silent operation.

The operation mode of air conditioner 9 set by the processing of S23 and the target temperature of air conditioning room 18 set by the processing of S25 are instructed to air conditioner 9 via communication controller 33.

In subsequent processing of S26, the distribution of the air volumes blown from air conditioning room 18 to rooms 2a to 2d is calculated in accordance with the difference between target temperature TT of each of rooms 2a to 2d and the current room temperature, time label 36b of the current time zone set for each of rooms 2a to 2d, room label 36c set for each of rooms 2a to 2d, and season label 36d of the current month set for each of rooms 2a to 2d.

Specifically, control device 10 first distributes the air volumes blown from air conditioning room 18 to each of rooms 2a to 2d from the difference between target temperature TT of each of rooms 2a to 2d and the current room temperature and time label 36b of the current time zone set for each of rooms 2a to 2d. At this time, the larger time label 36b is (the larger the air conditioning load is), the larger the air blowing volume from air conditioning room 18 is set. More specifically, the air volume of each room in the certain time zone may be decided based on a ratio of time label 36b of each room to the total of all the time labels.

Control device 10 estimates the size of the room space of each of rooms 2a to 2d based on room label 36c set for each of rooms 2a to 2d, and adjusts the balance of the air blowing volume of air conditioning room 18 with respect to rooms 2a to 2d. Accordingly, as described above, it is possible to prevent the air blowing volume of the air from air conditioning room 18 to each of rooms 2a to 2d from being set larger than necessary with respect to the size of the room space.

Control device 10 further adjusts the air blowing volume from air conditioning room 18 to each of rooms 2a to 2d in accordance with season label 36d of the current month set for each of rooms 2a to 2d in consideration of the energy required for the air conditioning of each of rooms 2a to 2d in the month. Accordingly, it is possible to supply the air conditioning energy corresponding to the air conditioning load factor that fluctuates depending on the season to each of rooms 2a to 2d.

When the distribution of the air volumes blown from air conditioning room 18 to rooms 2a to 2d in the processing of S26, control device 10 controls air conveyance fans 3a to 3d via communication controller 33 in accordance with the distribution of the air blowing volumes.

In the present exemplary embodiment, when time label 36b is set in the air conditioning load factor calculation processing, there are no calculated load factors 36a for the last 5 days, and an initial value or an average value of only calculated load factors 36a that are present is set as time label 36b, the processing of S26 is executed by using set time label 36b. On the other hand, the air blowing volumes from air conditioning system 20 to rooms 2a to 2d may be set to a predetermined air blowing volume without using time label 36b or the like in the processing of S26 by using 5 days from when air conditioning room 18 is operated for the first time to when time label 36b is set by averaging calculated load factors 36a in the last 5 days as a learning period of time label 36b.

In the present exemplary embodiment, the air volume to each of rooms 2a to 2d is decided based on time label 36b, room label 36c, and season label 36d. However, the air volume to each of rooms 2a to 2d is not limited thereto, and may be decided based on any one of calculated load factor 36a, time label 36b, room label 36c, and season label 36d.

Subsequently, control device 10 stores information necessary for setting the air conditioning load factor of each of rooms 2a to 2d in data storage 35 for each of rooms 2a to 2d (S27).

Specifically, in the processing of S27, the temperatures in rooms 2a to 2d at a point in time when the air conditioning control processing is started are stored in data storage 35. In the processing of S27, the passage of time of the temperatures in rooms 2a to 2d measured by room temperature sensors 11a to 11d is stored in data storage 35.

In the processing of S27, the passage of time of the air blowing volume (that is, the air blowing volume of each of air conveyance fans 3a to 3d provided corresponding to each of rooms 2a to 2d) of the air in air conditioning room 18 supplied to each of rooms 2a to 2d is stored in data storage 35. In the processing of S27, the passage of time of the air conditioning room temperature measured by air conditioning room temperature sensor 14 is stored in data storage 35.

Based on the information stored in data storage 35, the air conditioning load factors of each of rooms 2a to 2d are calculated in the air conditioning load factor calculation processing executed at a timing when the time zone is ended.

Subsequently, control device 10 controls the air conveyance fan corresponding to the room so as to stop blowing the air in air conditioning room 18 to the room in which the temperature in the room reaches the set target temperature (S28).

Thereafter, control device 10 reads out, from load factor storage 36, subsequent time label 36b in the room where the blowing of the air in air conditioning room 18 is stopped, and determines whether or not a change in time label 36b is large (S29). Control device 10 controls the air conveyance fan corresponding to the room so as to perform a weak air blowing operation on the room where the change in subsequent time label 36b is large (S30).

As described above, the energy necessary for the air conditioning is supplied to the room in advance by performing the weak air blowing operation on the room where the change of time label 36b is large in advance, and thus, the energy necessary for the air conditioning can be prevented from suddenly increasing as the air conditioning load increases. Thus, since it is possible to prevent the air blowing volumes of air conveyance fans 3a to 3d from increasing, it is possible to achieve the energy-saving operation and the silent operation.

After the processing of S30, control device 10 ends the air conditioning control processing.

As described above, in air conditioning system 20 according to the present exemplary embodiment, the air conditioning load factors (time label 36b or the like) are calculated for each of the plurality of rooms 2a to 2d. The distribution of the air volumes blown from air conditioning room 18 to rooms 2a to 2d is calculated based on the air conditioning load factors. Air conveyance fans 3a to 3d are controlled in accordance with the distribution of the air volumes. Thus, the air in air conditioning room 18 can be appropriately blown to each of the rooms in consideration of the air conditioning load of each of rooms 2a to 2d.

Although the present invention has been described above based on the exemplary embodiment, the present invention is not limited to the above exemplary embodiment at all, and it can be easily inferred that various modifications and variations can be made without departing from the gist of the present invention. For example, each exemplary embodiment may be modified by adding a part or a plurality of parts of the configuration of another exemplary embodiment to this exemplary embodiment or replacing the part or the plurality of parts of the configuration of this exemplary embodiment. The numerical values mentioned in the above exemplary embodiment are examples, and it is naturally possible to adopt other numerical values.

Control device 10 may be provided outside a house, for example, in a cloud server operated by a management company that manages the control of air conditioning system 20 so as to be able to communicate with the air conveyance fan or the like. In such a case, control device 10 is mainly achieved by a combination of a central processing unit (CPU) of the cloud server and software executed on the CPU.

The above-described software can be distributed independently by being stored in a storage medium or distributed via a network.

INDUSTRIAL APPLICABILITY

The air conditioning system according to the present invention is applicable to a detached residence or a composite dwelling residence such as an apartment. When the present invention is applied to a composite dwelling residence, one system corresponds to a residence unit, and each residence is not one room.

REFERENCE MARKS IN THE DRAWINGS 1 general residence
2a room
2b room
2c room
2d room
3a air conveyance fan
3b air conveyance fan
3c air conveyance fan
3d air conveyance fan
4 outside air introduction fan
5a discharge fan
5b discharge fan
5c discharge fan
5d discharge fan
6a circulation fan
6b circulation fan
6c circulation fan
6d circulation fan
9 air conditioner
10 control device
11a room temperature sensor
11b room temperature sensor
11c room temperature sensor
11d room temperature sensor
14 air conditioning room temperature sensor
18 air conditioning room
19 input and output terminal
31 air conditioning controller
32 air conditioning load factor calculator
33 communication controller
34 calendar function unit
35 data storage
36 load factor storage
36a calculated load factor
36b time label
36c room label
36d season label

The invention claimed is:

1. An air conditioning system comprising:
an air conditioning apparatus that is provided in an air conditioning room communicatively connected with a plurality of rooms;
air conveyance fans that are provided to correspond to the plurality of rooms in order to convey air in the air conditioning room to the plurality of rooms; and
a control device that calculates air conditioning load factors each decided based on an energy amount required for air conditioning of each of the plurality of rooms, calculates a distribution of air volumes of the air conveyed from the air conditioning room to the plurality of rooms based on the air conditioning load factors corresponding to the plurality of rooms, and controls the air conveyance fans in accordance with the distribution of the air volumes.

2. An air conditioning system comprising:
an air conditioning apparatus that is provided in an air conditioning room communicatively connected with a plurality of rooms;
air conveyance fans that are provided to correspond to the plurality of rooms in order to convey air in the air conditioning room to the plurality of rooms;
a control device that calculates a distribution of air volumes of the air conveyed from the air conditioning room to the plurality of rooms based on air conditioning load factors corresponding to the plurality of rooms, and controls the air conveyance fans in accordance with the distribution of the air volumes; and
room temperature sensors that measure room temperatures of the plurality of rooms,
wherein the control device detects a temperature change amount indicating a change amount of a temperature of each of the plurality of rooms in a predetermined time zone based on the room temperature of the each of the plurality of rooms acquired from the room temperature sensor, and calculates the air conditioning load factors based on an air blowing volume of the air conveyed to the each of the plurality of rooms from the air conditioning room in the predetermined time zone and the temperature change amount of the each of the plurality of rooms.

3. The air conditioning system according to claim 2, wherein the control device calculates an air conditioning load factor in a same predetermined time zone over a predetermined number of days for each of the plurality of rooms, calculates an average value of the air conditioning load factors calculated in the same predetermined time zone over the predetermined number of days for each of the plurality of rooms, and uses, as the air conditioning load factor in the predetermined time zone, the average value of the air conditioning load factors calculated for each of the plurality of rooms in the distribution of the air volumes.

4. The air conditioning system according to claim 2, wherein
the predetermined time zone is one time zone of a plurality of continuous time zones, and
the control device further calculates an air conditioning load factor in each time zone other than the predetermined time zone of the plurality of time zones for each of the plurality of rooms, calculates an average value of air conditioning load factors calculated in the plurality of time zones for each of the plurality of rooms, and uses, as the air conditioning load factor for the predetermined time zone, the average value of the air conditioning load factors calculated for each of the plurality of rooms in the distribution of the air volumes.

5. The air conditioning system according to claim 3, wherein the control device calculates an average value of air conditioning load factors in the predetermined time zone during a season for each of the plurality of rooms, and uses, as the air conditioning load factor in the predetermined time zone in the season, the average value of the air conditioning load factors calculated for each of the plurality of rooms in the distribution of the air volumes.

6. A storage medium storing an air-conditioning control program executed by a control device that controls operations of air conveyance fans provided to correspond to a plurality of rooms in order to convey air in an air conditioning room which is communicatively connected with the plurality of rooms and includes an air conditioning apparatus, the air-conditioning control program causing the control device to operate following processes of:
- calculating air conditioning load factors each decided based on an energy amount required for air conditioning of each of the plurality of rooms;
- calculating a distribution of air volumes of air conveyed from the air conditioning room to the plurality of rooms based on the air conditioning load factors corresponding to the plurality of rooms; and
- controlling the air conveyance fans in accordance with the distribution of the air volumes.

7. An air conditioning system comprising:
- an air conditioning apparatus that is provided in an air conditioning room communicatively connected with a plurality of rooms;
- air conveyance fans that are provided to correspond to the plurality of rooms in order to convey air in the air conditioning room to the plurality of rooms; and
- a control device that calculates a distribution of air volumes of the air conveyed from the air conditioning room to the plurality of rooms based on air conditioning load factors corresponding to the plurality of rooms, and controls the air conveyance fans in accordance with the distribution of the air volumes,
- wherein the control device further calculates the distribution of the air volumes related to the plurality of air conveyance fans based on differences between target temperatures and current temperatures of the plurality of rooms.

* * * * *